United States Patent [19]

Cielo et al.

[11] Patent Number: 4,748,329

[45] Date of Patent: May 31, 1988

[54] METHOD FOR ON-LINE THICKNESS MONITORING OF A TRANSPARENT FILM

[75] Inventors: Paolo Cielo, Montreal; Kenneth C. Cole, St. Hubert; Mario Lamontagne, Longueuil, all of Canada

[73] Assignee: Canadian Patents and Development Ltd., Ottawa, Canada

[21] Appl. No.: 15,704

[22] Filed: Feb. 17, 1987

[51] Int. Cl.⁴ ............................................. G01N 21/86
[52] U.S. Cl. ..................................... 250/560; 356/382
[58] Field of Search .............. 250/560, 561, 226, 339, 250/340, 343–346; 356/443, 444, 381, 382

[56] References Cited

U.S. PATENT DOCUMENTS 3,869,211  3/1975  Watanabe et al. .................. 250/560
3,892,490  7/1975  Uetsuki et al. ..................... 356/382

Primary Examiner—David C. Nelms
Attorney, Agent, or Firm—Yoshiharu Toyooka

[57] ABSTRACT

An optical system is described for monitoring the thickness of a translucent film either free-standing or coated on a reflective substrate. A polychromatic light beam is projected onto the surface of the sheet, and the transmitted light is detected at, at least, three wavelengths of which only one corresponds to an absorption band of the film material. By properly processing the three or more detected signals, an accurate evaluation of the film thickness is obtained irrespective of the presence of colored pigments in the material or of wavelength-dependent attenuation due to scattering at the film interfaces. Optical configurations are also described which avoid errors produced by interference fringes or front-surface reflections while simplifying the scanning of the sheet surface.

18 Claims, 7 Drawing Sheets

METHOD FOR ON-LINE THICKNESS MONITORING OF A TRANSPARENT FILM

FIELD OF INVENTION

The present invention is directed to an optical thickness measuring method and an apparatus for carrying out such a method. In particular, the present invention relates to a film thickness measurement by means of the absorption of light being transmitted through the film.

BACKGROUND OF THE INVENTION

The thickness inspection of thin organic films, such as extruded polymeric sheets, blown-film polyethylene materials or corrosion-protective transparent films and varnish paints on metal, is a problem of great concern for the plastics and rubber industry. The uniformity of the film thickness is important both for economic and for functional reasons. As such films are certified by the manufacturer as having a given minimal thickness, fluctuations above such a minimal thickness should be as small as possible in order to minimize the excess quantity of required raw material. As to the functional reasons, a minimum thickness is required for a given corrosion-protection performance, while exceedingly thick coatings are more subject to interface stresses eventually leading to a loss of adherence to the substrate. Moreover, a departure from a uniform cross-machine-direction thickness profile indicates the presence of a process malfunction such as an eccentricity of the concentric extruding dies in a cylindrical film-blowing machine.

REVIEW OF THE PRIOR ART

Although a wide variety of physical approaches are possible for thickness measurement including electric capacitance, microwave attenuation and ultrasonic pulse-echo (see, e.g. J. D. Lenk, "Handbook of Controls and Instrumentation", Prentice-Hall, 1980, section 7-4), the most widely used methods for thickness measurement are based on nuclear and infrared absorption techniques. Nuclear sensors of the beta or gamma-backscattering type can inspect plastic sheets from 5 to 100 $\mu$m in thickness, while high-power x-ray transmission devices can be used for thicker sheets. Such instruments are however relatively expensive and have a number of limitations: they require frequent recalibration, must be installed in close proximity to the film, have a slow response time and must be handled with care because of radiation hazards.

Infrared absorption techniques are increasingly used for industrial inspection of transparent sheets or coatings (see U.S. Pat. Nos. 3,994,586, 4,510,389, 4,490,612; Canadian Patent Nos. 1,024,776 and 1,084,296). Generally speaking, the basic approach consists in measuring the attenuation of a light beam after transmission through the sheet at an absorption wavelength, and to calculate the thickness from the depth of the absorption peak. When a coating on an opaque substrate is to be monitored, the detector is mounted near the light source to detect the reflected light beam. The spectral distribution of the light transmitted through the film is given by the Lambert absorption law:

$$T(\lambda)/T_0 = exp[-K(\lambda)d] \qquad (1)$$

where $K(\lambda)$ is the absorption coefficient in cm$^{-1}$ and d is the film thickness in cm, $T(\lambda)$ is the transmitted intensity at the wavelength $\lambda$ and $T_0$ is the intensity transmitted in a spectral region where there is no appreciable absorption (although Fresnel reflection losses may occur). The absorbance of the film is defined as:

$$A(\lambda) = -log_{10}[T(\lambda)/T_0] = 0.4343 \cdot K(\lambda) \cdot d \qquad (2)$$

of the transmittance $T(\lambda)/T_0$ at the chosen wavelength, one can then evaluate the absorbance and thus the thickness from equation (2) after the factor $K(\lambda)$ has been determined from a calibration with samples of known thickness. It should be emphasized that such a ratio measurement is unaffected by common-noise effects such as source aging or spectrally neutral dirt accumulation.

Problems encountered with the infrared approach for thickness measurement are mainly related to the opacity of pigment-filled films. Although the ratio measurement based on equation (2) is independent of the absolute value of the transmitted light, the spectral transmission curve of pigment-filled films is often found to be deformed in a way to substantially modify the $T(\lambda)/T_0$ ratio and thus the thickness d evaluated from equation (2). Similar thickness-evaluation inaccuracies are produced by wavelength-dependent scattering from the film surface or from the surface of the reflective substrate. Errors are also caused by water-absorption peaks which depend on the relative air humidity level. Finally, Fresnel reflections at the film surface produce additional uncertainties because of the presence of a front-reflected beam which is unaffected by the spectral-transmissivity curve as well as of the presence of interference fringes due to multiple reflections within the film. Fresnel reflections and interference fringes can be substantially reduced by using polarized radiation near the Brewster angle of incidence (see U.S. Pat. No. 4,129,781), but such an approach requires a relatively large angle of incidence, making the apparent thickness measurement very dependent on variations of such an angle as produced, e.g., by film wobbling during extrusion. Indeed, the real value d of the film thickness must be obtained from the apparent value d' (path of the light beam within the film) using the trigonometric relation:

$$d = d'\cos\left[\sin^{-1}\frac{(\sin\theta)}{n}\right] = d'\sqrt{1 - \frac{(\sin\theta)^2}{n}} \qquad (3)$$

Another method to avoid interference fringes uses an integrating cavity (Canadian Patent Nos. 1,080,504 and 1,084,296) but requires a close proximity of the sensing device to the sheet. Still another approach, which is valid only for relatively thin or very smooth films (see, e.g., U.S. Pat. Nos. 3,601,492 or 4,293,224), uses the interference-fringe period $\Delta\nu$ (in cm$^{-1}$), the film refractive index n and the angle of incidence $\theta$ to calculate the film thickness from the expression:

$$d = (\tfrac{1}{2})\Delta\nu(n^2 - \sin^2\theta)^{\tfrac{1}{2}} \qquad (4)$$

This approach is however valid only for relatively uniform films whose thickness variations are small with respect to the light wavelength and for a narrow beam whose angular aperture around $\theta$ is smaller than an angular-fringe period.

SUMMARY OF INVENTION

Briefly stated, according to the present invention, an optical film thickness measuring method for measuring the thickness of a thin sheet includes a step of projecting an incident beam of polychromatic light onto a surface of the sheet and a step of detecting the light transmitted through the sheet at, at least three different wavelengths $\lambda_1$, $\lambda_2$ and $\lambda_3$. The first wavelength $\lambda_1$ corresponds to an absorption band of a material of the sheet. The second and third wavelengths $\lambda_2$ and $\lambda_3$ are outside the absorption band and are substantially free from absorption by the material. The method further includes a step of producing three electric signals $T(\lambda_1)$, $T(\lambda_2)$ and $T(\lambda_3)$ representative of the light detected at the three different wavelengths $\lambda_1$, $\lambda_2$ and $\lambda_3$. A step of establishing a reference signal $T_o$ is carried out by processing the electric signals $T(\lambda_2)$ and $T(\lambda_3)$ according to a pre-established non-linear relationship among $T_o$, $T(\lambda_2)$ and $T(\lambda_3)$. The method further includes a step of comparing the reference signal $T_o$ to the electric signal $T(\lambda_1)$ to determine the thickness of the thin sheet.

According to another aspect of the invention, an optical thickness measuring apparatus for measuring the thickness of a thin sheet comprises a source of polychromatic light for projecting an incident light beam onto a surface of the sheet and detecting means for detecting the light transmitted through the sheet at at least three different wavelengths $\lambda_1$, $\lambda_2$ and $\lambda_3$. The first wavelength $\lambda_1$ corresponds to an absorption band of a material of the sheet. The second and the third wavelengths $\lambda_2$ and $\lambda_3$ are outside the absorption band and are substantially free from absorption by the material. The apparatus further includes optoelectrical transducers for producing three electric signals $T(\lambda_1)$, $T(\lambda_2)$ and $T(\lambda_3)$ representative of the light detected at the three different wavelengths $\lambda_1$, $\lambda_2$ and $\lambda_3$. The apparatus further contains signal processing means for establishing a reference signal $T_o$ by processing electric signals $T(\lambda_2)$ and $T(\lambda_3)$ and for comparing the reference signal $T_o$ to the electric signal $T(\lambda_1)$ to determine the thickness of the sheet.

OBJECTS OF INVENTION

It is an object of the present invention to provide an optical thickness measuring method for measuring the thickness of a thin sheet.

It is a further object of the present invention to provide an optical thickness measuring method for measuring the thickness of a thin sheet by means of absorption of light being transmitted through the sheet.

It is yet another object of the invention to provide an apparatus which carries out the above method.

BRIEF DESCRIPTION OF DRAWINGS

For more complete understanding of the present invention and for further objects and advantages thereof, reference may be made to the following description taken in conjunction with the accompanying drawings in which.

DETAILED DESCRIPTION OF PREFERRED EMBODIMENTS OF INVENTION

Figure 1:
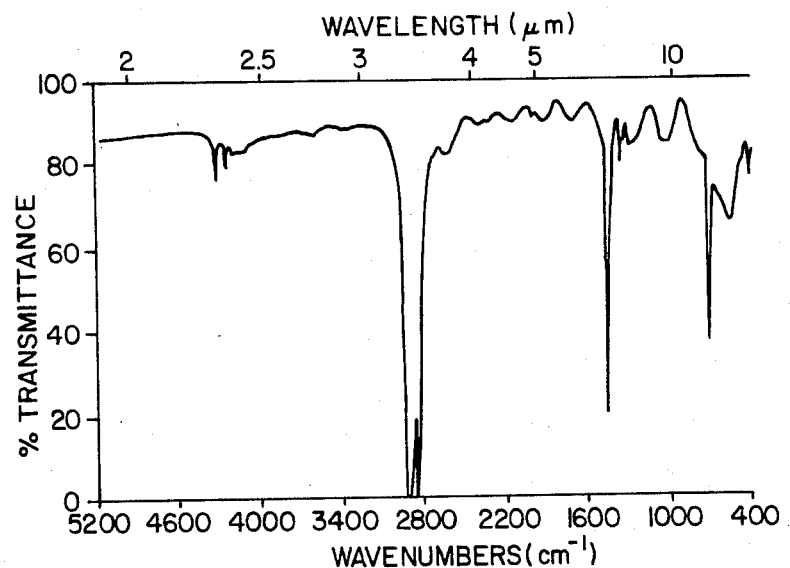
FIG. 1 shows a transmittance spectrum of a moderately-dyed 15 $\mu$m thick polyethylene film.
Figure 2:
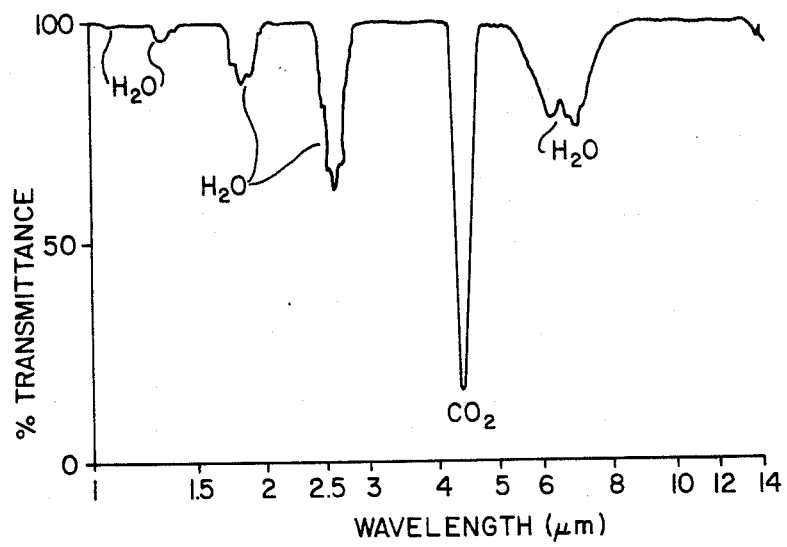
FIG. 2 shows a transmittance spectrum through a 1 m path of air with standard humidity.

The approach described here substantially reduces the limitations of the previously described infrared metrology methods. In order to better understand the parameters involved, FIG. 1 shows the transmittance spectrum (ratio of the transmittance obtained through the film to the spectrum obtained without film) of a moderately-dyed, 15 $\mu$m-thick polyethylene film. Absorption regions are clearly seen around 4200, 2900, 1420 and 730 cm$^{-1}$ which are characteristic of the polyethylene molecular-vibration bands. Also visible are some interference fringes in the 2000 to 500 cm$^{-1}$ spectral region where the film surface roughness amplitude is small relative to the wavelength. By choosing as $T_0$ and $T(\lambda)$ the transmittance values at about 2.1 $\mu$m (4750 cm$^{-1}$) and at 2.35 $\mu$m (4.250 cm$^{-1}$), the absorbance and thus the thickness can be evaluated with rugged low-wavelength detectors and without being affected by the 1.9 $\mu$m and 2.7 $\mu$m moist-air absorption bands. A typical transmission spectrum (without sample) through a 1 m path of air at standard humidity conditions is shown in FIG. 2.

Figure 3A:
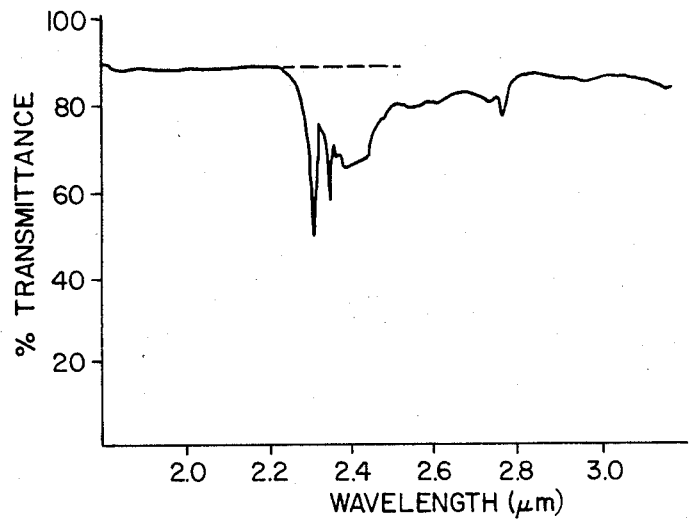
FIGS. 3a and 3b show graphs indicating respectively the short-wavelength spectral distribution of the light transmitted through a clear-plastics, 65 $\mu$m thick film and a white-pigmented 20 $\mu$m thick film.
Figure 3B:
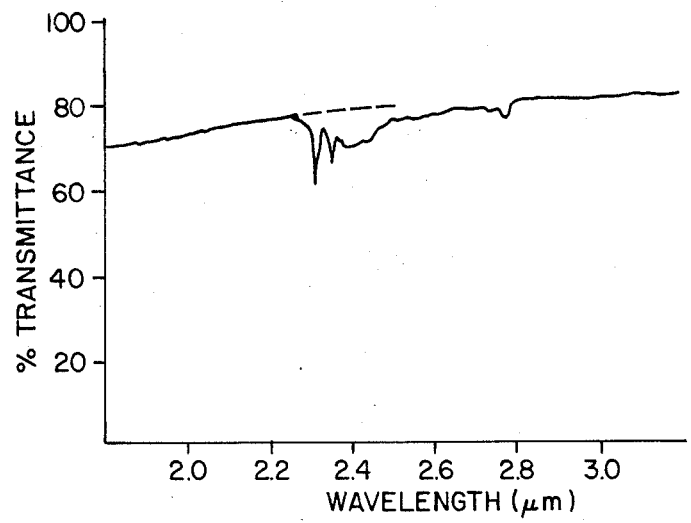

One of the problems encountered with films containing a large amount of light-scattering pigments or having a relatively rough surface finish is the wavelength dependence of the scattering-related attenuation in the transmitted or reflected light beam. FIGS. 3a and 3b show graphs indicating short-wavelength spectral distribution of the light transmitted through a clear-plastics, 65 $\mu$m thick film (FIG. 3a) and a white-pigmented 20 $\mu$m thick film (FIG. 3b). As shown in FIG. 3b, scattering losses are higher at short wavelengths where the scattering cross-section becomes comparable to or larger than a light wavelength. An expression of the attenuation suffered by the light beam specularly reflected by a rough surface is obtained from the diffraction theory of light scattering in the limit of $R_q$ small with respect to the wavelength ($R_q$ is the average size of the dispersed pigment particles or of the surface roughness amplitude):

$$I(\lambda) = I_o \exp\{-4\pi R_q \cos\theta/\lambda)^2\} \qquad (5)$$

where $I(\lambda)$ is the undeviated light spectral distribution, $I_o$ is the light intensity reflected by a perfectly smooth mirror or transmitted by a perfectly smooth film and $\theta$ is the angle of incidence. The spectral distribution of the detected light is thus affected by scattering losses which are higher at short wavelengths as determined by the nonlinear equation (5). The effect of these scattering-induced losses is visible in FIG. 3b, which is the transmission spectrum of a 20 $\mu$m-thick polyethylene film with highly scattering white-pigment fillers, as compared to the spectrum of a 65 $\mu$m-thick film without pigments shown in FIG. 3a.

If the thickness is evaluated by simply taking the ratio between the transmissivities at, e.g. 2.1 $\mu$m and 2.35 $\mu$m, FIG. 3b shows that the estimated value will be smaller than the real value when the scattering-related attenuation is of the same order of magnitude as the absorption-related attenuation. Better thickness evaluation can be obtained independently of the scattering level by measuring the transmittance at three wavelengths, e.g. 2.05 $\mu$m, 2.2 $\mu$m and 2.35 $\mu$m, and using the two signals detected at the lower wavelengths to extrapolate the transmittance before absorption at 2.35 $\mu$m by using equation (5), as shown by the dotted lines in FIGS. 3a and 3b.

Figure 4:
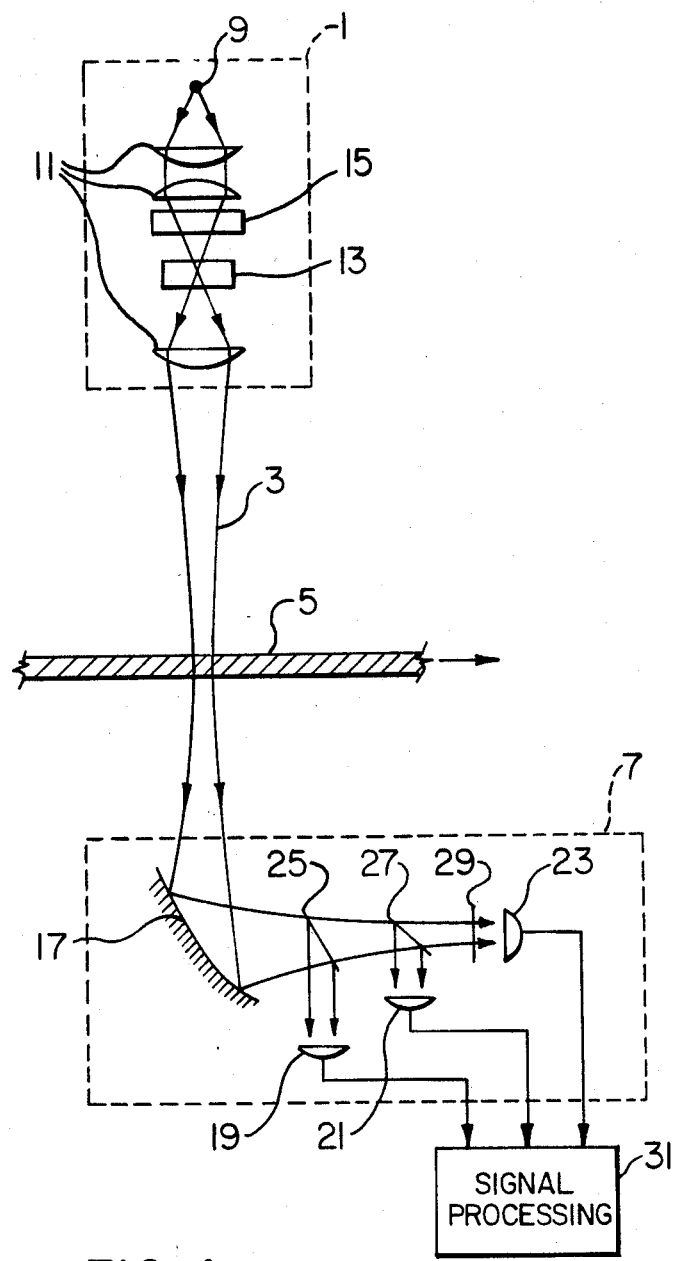
FIG. 4 is a schematic illustration of an optical thickness measuring apparatus according to one embodiment of the present invention.

Referring now to FIG. 4 of the drawings, there is shown a schematic diagram of a preferred embodiment of the present invention, a thickness-monitoring device based on a three-wavelength balancing method. While the figure illustrates an arrangement for transmission measurement, a similar configuration can be devised for reflection measurement to be used for inspection of polymer-coated opaque sheets.

In FIG. 4, a light source unit 1 sends a beam 3 of polychromatic light towards a plastic thin sheet 5. A detection unit 7 is positioned on the opposite side of the sheet 5 to detect the light transmitted through the sheet. The light source unit 1 includes a source 9 of polychromatic light, collimating mechanism such as lenses and an optional chopper 13. The unit further includes another optional water cell 15 whose function will be described below. The detection unit 7 on the other hand contains a reflecting mirror 17 and three detectors 19, 21 and 23 which consist of optoelectric transducers. With the help of three filters 25, 27 and 29, the detectors, in this embodiment, separately measure the intensity of the transmitted light at the three different wavelengths of 2.05±0.08 $\mu$m, 2.2±0.08 $\mu$m and 2.35±0.08 $\mu$m. Signals generated by the detectors are processed by a signal processing means 31 which produces an indication of the thickness of the thin sheet.

It is important to note that in this case the two signals at 2.05 and 2.2 $\mu$m are processed using the nonlinear expression given by equation (5) in order to extrapolate the unabsorbed transmittance $T_o$ at 2.35 $\mu$m from which the thickness will be determined following equation (2). This is quite different from a simple line-interpolation method which is used, e.g. in U.S. Pat. No. 4,551,022, to obtain the average transmittance at a certain wavelength by arithmetically averaging the spectral transmittances obtained on both sides of the absorption peak.

In order to improve the accuracy, an optional water cell 15 can be provided in the source unit 1 as shown in FIG. 4. The water cell 15, typically a quartz-walled cell containing a thin, 1 mm thick or less, water layer, eliminates signal fluctuations which may be produced by water droplets in the atmosphere. A self-heating water vapour cell may alternatively be used to neutralize changes in ambient air moisture. It can be seen by referring to FIG. 2 that the water-absorption bands near 1.9 and 2.5 $\mu$m are in close proximity to the spectral detection areas of 2.05 and 2.35 $\mu$m, so that the signals detected in these areas will be affected by the water-moisture contents unless the filters used in the detection unit are unrealistically selective. A simple solution to this problem is the insertion of a water cell which effectively removes from the spectral distribution of the light beam incident on the detection unit the light in the water-sensitive bands near 1.9 and 2.5 $\mu$m. Once the water-sensitive spectral regions are removed from the beam, no variations in the detected signal will be generated by changes in the relative air-humidity level.

Figure 5:
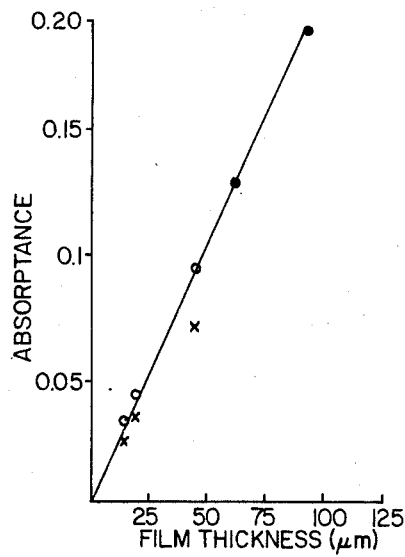
FIG. 5 is a correlation graph between absorptance and the film thickness.

FIG. 5 shows the improvement in the absorbance versus film-thickness correlation for a number of extruded polyethylene sheets as obtained by the modified three-wavelength approach. In the graph, clear plastic films are indicated by ●, pigmented films with no correlation by x and pigmented films with three-wavelength correlation according to the present invention by ○. As seen in the graph, errors of up to 30% are produced in the measurement of the film thickness when the conventional approach with no correction is used for monitoring pigmented films. A much more accurate correlation is obtained by applying the three-wavelength correction described above. Even highly scattering or heavily carbon-filled films which cannot be monitored by conventional infrared methods could be satisfactorily inspected with our approach.

Figure 6:
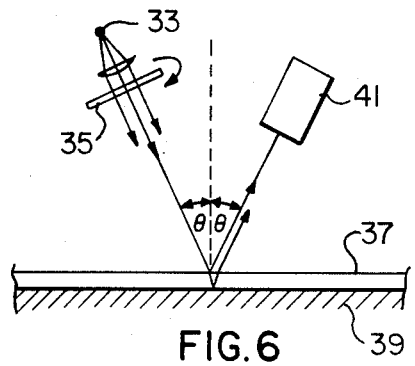
FIG. 6 is a schematic diagram of an optical thickness measuring apparatus according to another embodiment of the invention.

As mentioned above, a reflecting configuration can be used for the inspection of transparent coatings on an opaque substrate. FIG. 6 shows such an embodiment which is particularly useful for the inspection of thin coatings on a metallic sheet. A light beam from a source 33 is incident through a rotating polarizer 35 on the surface of a coating on a substrate 39 at an angle of incidence $\theta$. The specularly reflected beam is analyzed by a spectrometer 41, which may be made of a series of filters as in the detection unit of FIG. 4; or contains an interferometer as in a FTIR spectrometer; or else uses a dispersive component as in a grating monochromator (see, e.g. U.S. Pat. No. 4,254,337).

Figure 7:
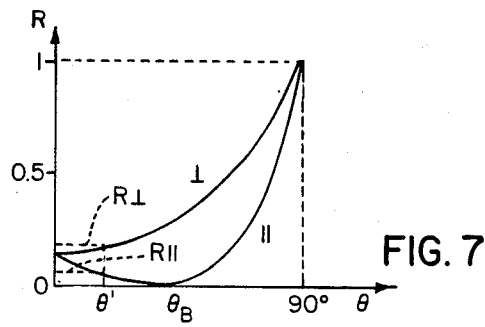
FIG. 7 shows curves indicating surface reflection of polarized lights.
Figure 8:
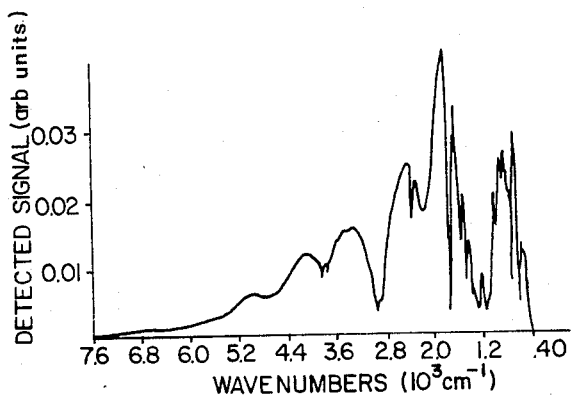
FIG. 8 shows the spectral distribution of an unpolarized light reflected at near the Brewster angle from a polymeric coating on steel.
Figure 9A:
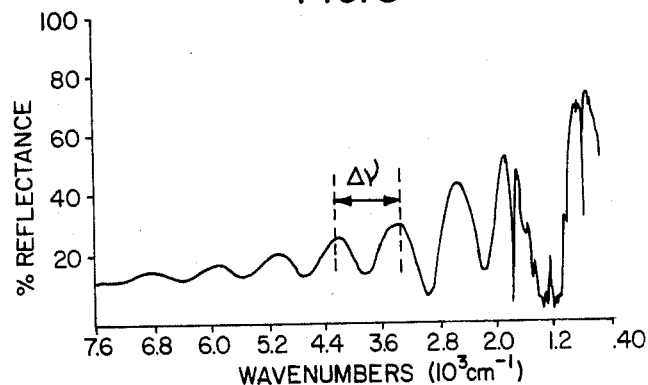
FIGS. 9a and 9b show respectively spectra obtained with a light beam polarized in a direction perpendicular and parallel to the plane of incidence.
Figure 9B:
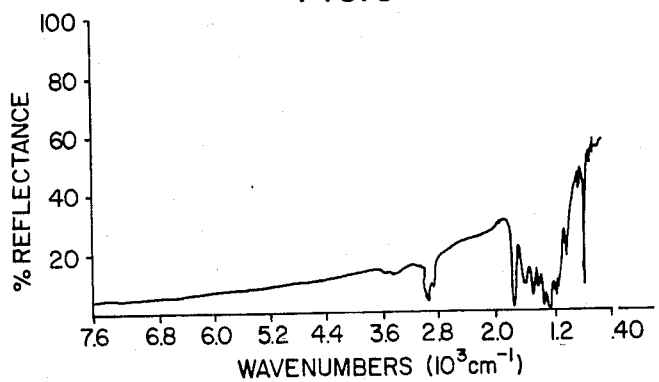

When the polarizer is rotated to transmit either the polarization component parallel or perpendicular to the plane of incidence, the front-surface reflection at the air-to-coating interface follows curves of the kind shown in FIG. 7 in which $\theta$ is the angle of incidence and R is reflectivity. At angles near the Brewster angle $\theta_B$, the front-surface reflectivity from the dielectric film is very small for the parallel-polarized light. Advantage can be taken of such a phenomenon to avoid front-surface reflections and thus to eliminate spurious interference fringes, as it is taught in U.S. Pat. Nos. 3,994,586 or 4,129,781. Typical examples are illustrated in FIGS. 8 and 9. FIG. 8 shows the unpolarized spectral distribution of the light reflected near the Brewster angle from a nearly 5 $\mu$m-thick polymeric coating on steel. FIG. 9 shows the spectra obtained with a light beam polarized in a direction (a) perpendicular and (b) parallel to the plane of incidence, after normalization by comparison with the respective neutral-mirror reference curves. The film thickness can reliably be measured either by monitoring the depth of the absorption peak near 2900 $cm^{-1}$ in FIG. 9b and using equation (2), or by measuring the interference fringe period $\Delta$ from FIG. 9a and using equation (4).

When operating at relatively large angles of incidence $\theta_B$, the error produced by a small variation of the angle $\theta$ as caused, e.g. by sheet angular wobbling, is relatively large as seen from equation (3). To reduce the incidence of such an error while maintaining the advantage of the polarized-light spectra, a relatively small angle of incidence $\theta'$ as shown in FIG. 8 can be used. By amplifying the difference between the parallel-polarized $R_\parallel$ and the perpendicular-polarized spectra by an amount corresponding to the $R_\parallel/R_\perp$ ratio and by applying such a spectral correction to the polarized spectra, the front-surface reflection may be suppressed or enhanced respectively. By finally taking the ratio of the two spectral distributions, the interference fringe visibility is enhanced even in the presence of large fluctuations of the substrate reflectivity.

The surface of a sheet must often be scanned, such as when the cross-machine-direction thickness profile along a coated sheet has to be checked for uniformity in order to verify if the extruding dies across the sheet are set correctly. To assist the operator in the die-adjustment operation, as well as to detect the presence of any process malfunction during operation, a quick display of the film-thickness profile must be obtained. Mechanical displacement of the full detection and source units across the film is a slow and cumbersome operation. The approach described here makes it possible to scan a wide surface with minimum part displacement.

Figure 10:
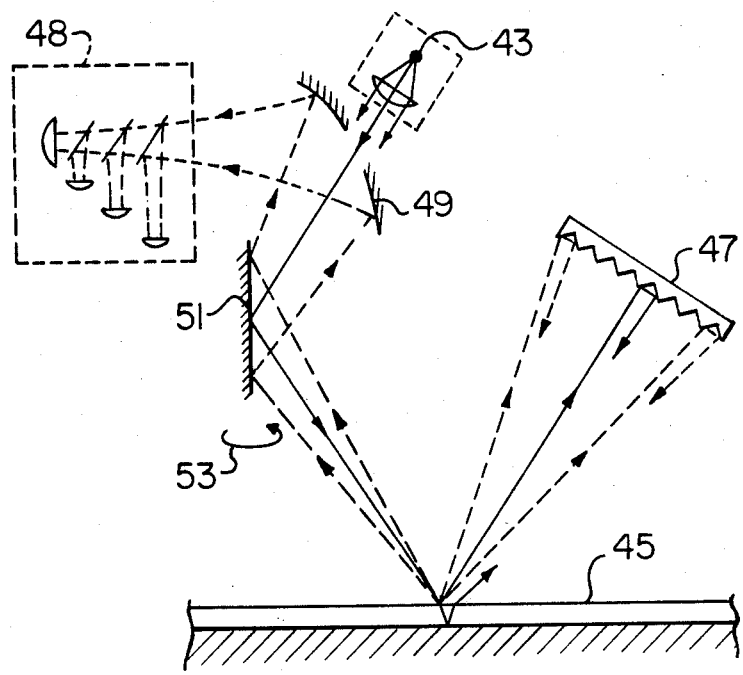
FIG. 10 is a schematic illustration of the scanning thickness measuring apparatus according to a still further embodiment of the invention.

A schematic diagram of the scanning thickness-measuring device is shown in FIG. 10. As in FIGS. 4 and 6, a wide-spectral-bandwidth light beam from a source 43 is directed at sheet 45. The reflected beam is however not directly detected, but rather collected by a wide retroreflecting mirror, extending across the sheet width. Such a retroreflector 47, which can be made, for example, of an array of corner-cube-shaped metallic cells, has the property of reflecting back the light in the same direction as the incident beam. Such devices are often used for night-time traffic signs. The major advantage of such an approach is that the backscattered beam will retrace back the same path to the source and detection units even in the presence of an appreciable misalignment or angular wobbling of the sheet.

Figure 11:
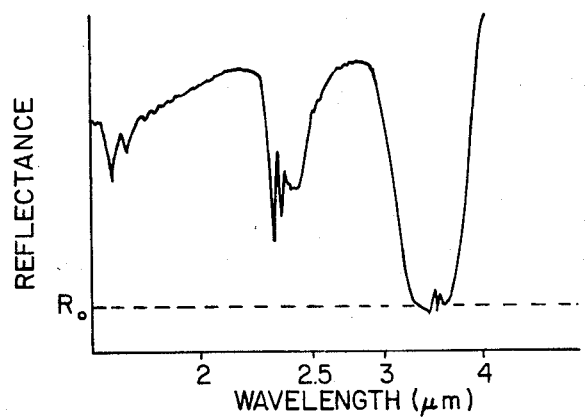
FIG. 11 is a reflectance spectrum of a polymer coating on aluminum.

The backscattered light may be directed toward the detection unit 48 by a simple beam-splitter or else, as shown in FIG. 10, an off-axis parabolic mirror 49 with center hole may be used if the inspected surface produces appreciable angular-scattering of the retroreflected beam. An angular-scanning mirror 51 allows to scan both the projected and the retro-reflected beams across the sheet width, without requiring any other part movement. If the rotation axis of the mirror is perpendicular to the sheet surface, as symbolized by an arrow 53 in FIG. 10, the scanned curve will be an arc of circle centered on the rotation axis. This configuration ensures that the angle of incidence of the projected beam on the film is constant. If another direction of the rotation axis is chosen, equation (3) must be used to correct the apparent thickness value as a function of the variable angle of incidence. Although a reflective configuration is shown in FIG. 11, a transmissive configuration is also possible for scanning free-standing films by placing the retroreflector under the film.

One of the problems encountered when inspecting dielectric coatings in reflection is the presence of front-surface reflections at the air-coating interface. As mentioned above, such Fresnel-reflected light is not transmitted through the film and thus does not contain spectrally-significant features related to the film thickness. A typical reflectance spectrum of a 70 μm-thick polymer coating on aluminum is shown in FIG. 11. If one compares this to the transmission spectrum of FIG. 1, one can see that the absorption peak near 2.4 μm is deeper because of the larger thickness of the film in the case of FIG. 11. A front-surface constant reflection $R_o$ is however present in this figure, which must be subtracted from the whole spectrum if the values of $T(\lambda)$ and $T_o$ are to be correctly introduced in equation (2). A problem arises in the calculation of $R_o$, which is not normally known a priori because it depends on the ratio between the front-surface and the back-substrate reflections which depends in turn on the unknown surface finish of the coating and substrate light-scattering surfaces. The front-surface reflection cannot be suppressed by polarizing optics in this case, because the retroreflector element normally de-polarizes the backscattered light.

The proposed solution to this problem consists in measuring $R_o$ in real time by simply adding a fourth detector in the detection unit of FIG. 10, which is centered in the 3.5 μm spectral region. As shown in FIG. 1, such a detector should register a signal of substantially zero level as long as the polymer film thickness exceeds 5 or 10 μm, because of the very large absorption coefficient $K(\lambda)$ due to the C-H molecular absorption at this wavelength. If a finite signal is obtained in this region, as shown in FIG. 11, this signal corresponds to the value of $R_o$ for relatively thick films. By an iteration approach, taking into account the relative depths of the 2.4 and 3.5 μm absorption peaks and comparing with the respective $T(\lambda)$ values as inferred from FIG. 1, films of thickness smaller than 10 μm can be evaluated as well. It is important to note that such an approach is valid even if the film and substrate specular reflectivities continuously vary during the extrusion process or across the sheet width, because the $R_o$ correction is continuously re-calculated in real time.

Figure 12:
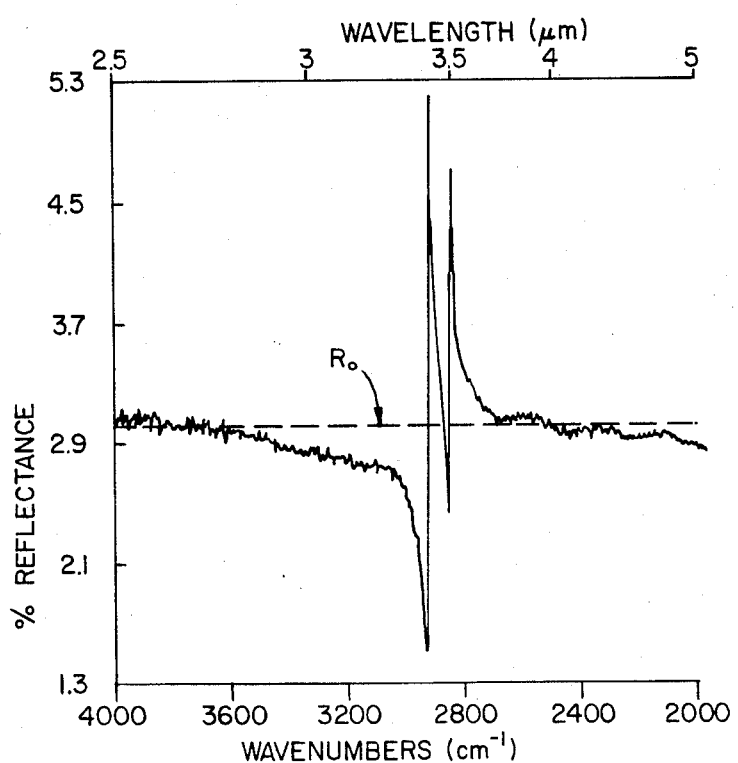
FIG. 12 shows variations in the front-surface reflectivity of a thick polymer in the vicinity of the 3.5 $\mu$m absorption band.

The choice of the spectral features of the 3.5 μm filter requires a careful analysis. The Fresnel reflection law for a light beam normally incident on a dielectric medium is written:

$$R = \frac{(n-1)^2 + (k/4\pi\nu)^2}{(n+1)^2 + (k/4\pi\nu)^2} \tag{6}$$

where $\nu$ is the frequency in wavenumbers. Both the real refractive index n and the absorption coefficient k are subject to variations near an absorption band such as the 3.5 μm area. In the limiting case of a very large absorption coefficient k, the reflectivity R may paradoxically approach 100% where the sample strongly absorbs (reststrahlen effect). The front-surface reflectivity must thus first be probed on a very thick polymer sample to scrutinize the absorbance-related subtle variations of the front-surface reflectivity in the vicinity of the 3.5 μm absorption band. Such variations are shown in FIG. 12. The multiple reflectance peaks visible in this figure can be correlated with the fine modulation of the reflectance spectrum in the 3.5 μm area of FIG. 11. From an analysis of these fluctuations, one can conclude that if the reference 3.5 μm detector is chosen to have a spectral bandwidth extending from 3.4 to 3.6 μm, the positive and negative reflectance peaks are effectively averaged out giving a reliable estimation of the $R_o$ level.

We claim:

1. An optical film thickness measuring method for measuring the thickness of a thin sheet, comprising steps of:
   (a) projecting an incident beam of polychromatic light onto a surface of the thin sheet,
   (b) detecting the light transmitted through the sheet at, at least three different wavelengths $\lambda_1$, $\lambda_2$ and $\lambda_3$, the first wavelength $\lambda_1$ corresponding to an absorption band of a material of the sheet and the second and the third wavelengths $\lambda_2$ and $\lambda_3$ being outside the absorption band and being substantially free from absorption by the material,
   (c) producing three electric signals $T(\lambda_1)$, $T(\lambda_2)$ and $T(\lambda_3)$ representative of the light detected at the three different wavelengths $\lambda_1$, $\lambda_2$ and $\lambda_3$,
   (d) establishing a reference signal $T_o$ from the electric signals $T(\lambda_2)$ and $T(\lambda_3)$ by using a pre-established non linear relationship among $T_o$, $T(\lambda_2)$ and $T(\lambda_3)$, and
   (e) comparing the reference signal $T_o$ to the electric signal $T(\lambda_1)$ to determine the thickness of the thin sheet.

2. The method as defined in claim 1 wherein the step of establishing a reference signal comprises extrapolating the reference signal $T_o$ from the electric signals $T(\lambda_2)$ and $T(\lambda_3)$.

3. The method as defined in claim 2, further comprising a step of removing components of the light beam corresponding to wavelengths absorbed by water so that the electric signals will be insensitive to the humidity of the air along the path of the light beam.

4. The method as defined in claim 3 wherein the detecting step is carried out on the side of the sheet opposite of the incident beam.

5. The method as defined in claim 3 wherein the incident light beam is modulated at a pre-selected frequency to reduce low frequency environmental and electronic noises.

6. The method as defined in claim 5 wherein the sheet is of moderately dyed polyethylene, and the three wavelengths $\lambda_1$, $\lambda_2$ and $\lambda_3$ are respectively 2.35 $\mu$m, 2.05 $\mu$m and 2.2 $\mu$m.

7. The method as defined in claim 3 wherein the detecting step is carried out on the same side of the sheet as the incident beam.

8. A method as defined in claim 7, further comprising steps of adjusting the incident angle of the incident light beam to the Brewster angle approximately; and polarizing the incident light beam alternately in parallel and in perpendicular to the plane of incidence so that the transmittance spectrum can be produced with and without interference fringe perturbation.

9. A method as defined in claim 7 further comprises steps of scanning the incident light beam across the width of the film, and retroreflecting at the same angle light onto the surface of the film before the step of detecting so that the effect of the angular variation of the light beam is reduced.

10. A method as defined in claim 7 wherein the detecting step comprises the detection of a fourth wavelength $\lambda_4$ which is absorbed by the film, and the signal processing step further comprises the production a fourth signal $T(\lambda_4)$ indicative of the front reflection of the incident light beam and a step of subtracting the signal $T(\lambda_4)$ from the signal $T(\lambda_1)$, $T(\lambda_2)$ and $T(\lambda_3)$ to generate signals free from front reflection.

11. An optical thickness measuring apparatus for measuring the thickness of a thin sheet comprising:
   (a) a source of polychromatic light for projecting an incident light beam onto a surface of the sheet;
   (b) detecting means for detecting the light transmitted through the sheet at, at least three different wavelengths $\lambda_1$, $\lambda_2$ and $\lambda_3$, the first wavelength $\lambda_1$ corresponding to an absorption band of a material of the sheet and the second and the third wavelengths $\lambda_2$ and $\lambda_3$ being outside the absorption band and being substantially free from absorption by the material;
   (c) optoelectrical transducers for producing three electric signals $T(\lambda_1)$, $T(\lambda_2)$ and $T(\lambda_3)$ representative of the light detected at the three different wavelengths $\lambda_1$, $\lambda_2$ and $\lambda_3$; and
   (d) signal processing means for establishing a reference signal $T_o$ from the electric signals $T(\lambda_2)$ and $T(\lambda_3)$ and for comparing the reference signal $T_o$ to the electric signal $T(\lambda_1)$ to determine the thickness of the sheet.

12. The apparatus as defined in claim 11 further comprising filtering means positioned in between the light source and the detecting means for removing components of light beam corresponding to wavelengths absorbed by water so that the electric signals will be insensitive to water vapour in the air along the path of the light beam.

13. The apparatus as defined in claim 12 wherein the film is in between the light source and the detecting means so that the light beam is transmitted throughout the thickness of the film.

14. The apparatus as defined in claim 13 further comprises a light chopper means for modulating the incident light beam and filtering means centered at the modulation frequency to reduce environmental and electronic noise.

15. The apparatus as defined in claim 12 wherein the light source and the detecting means are on the same side of the film.

16. The apparatus as defined in claim 15 wherein the incident angle of the incident light beam is approximately at Brewster angle, the apparatus further comprising a variable polarizer positioned near the source for polarizing the light beam alternately in parallel and in perpendicular to the plane of incidence so that the transmittance spectrum can be produced with and without interference fringe perturbation.

17. The apparatus as defined in claim 15 further comprises angular scanning mirror means for scanning the incident light beam across the width of the sheet; retroreflector means for retroreflecting at the same angle light onto the surface of the sheet; and mirror means for collecting retroreflected light from the sheet and projecting onto the detecting means so that the effect of the angular variation of the light beam is reduced.

18. The apparatus as defined in claim 15 wherein the detecting means further comprises a filter to detect a fourth wavelength $\lambda_4$ which is absorbed by the sheet, and the signal processing means establishes a fourth signal $T(\lambda_4)$ indicative of the front reflection of the incident light beam and subtracts the signal $T(\lambda_4)$ from the signals $T(\lambda_1)$, $T(\lambda_2)$ and $T(\lambda_3)$ to generate signals free from front reflection.

* * * * *